United States Patent [19]

Shin et al.

[11] Patent Number: 4,673,123

[45] Date of Patent: Jun. 16, 1987

[54] FILLER FOR WELDING A HEAT RESISTANT NICKEL-BASE ALLOY

[75] Inventors: Shigeo Shin; Tamao Takatsu; Teiichiro Saito, all of Tokyo; Akiyoshi Kikuchi; Tsuneo Nakanishi, both of Kanagawa, all of Japan

[73] Assignees: Nippon Welding Rod Co., Ltd.; Fuji Electric Company Ltd., both of Tokyo; Fuji Electric Corporate Research, Kanagawa, all of Japan

[21] Appl. No.: 731,614

[22] Filed: May 7, 1985

Related U.S. Application Data

[63] Continuation of Ser. No. 539,353, Oct. 6, 1983, abandoned.

[30] Foreign Application Priority Data

Oct. 6, 1982 [JP] Japan ................................ 57-175929
Nov. 4, 1982 [JP] Japan ................................ 57-193728
Nov. 24, 1982 [JP] Japan ................................ 57-205644

[51] Int. Cl.$^4$ ........................ C22C 19/03; C22C 30/00
[52] U.S. Cl. ................. 228/263.13; 420/443; 420/454; 420/455; 420/459; 420/586; 219/146.23
[58] Field of Search ............... 420/443, 452, 453, 454, 420/455, 459, 581, 583, 584, 585, 586, 588; 148/426, 427; 228/263.13, 263.11; 219/146.22, 146.23, 85 H

[56] References Cited

U.S. PATENT DOCUMENTS

| | | | |
|---|---|---|---|
| 4,039,330 | 8/1977 | Shaw ................................... | 420/443 |
| 4,108,648 | 8/1978 | Zhurkina et al. .................... | 420/443 |
| 4,227,925 | 10/1980 | Hosoi et al. ......................... | 420/443 |
| 4,415,530 | 11/1983 | Hunt ................................... | 420/453 |
| 4,443,406 | 4/1984 | Sukekawa et al. .................. | 420/586 |

FOREIGN PATENT DOCUMENTS

| | | | |
|---|---|---|---|
| 2418219 | 11/1974 | Fed. Rep. of Germany ...... | 420/443 |
| 0117626 | 9/1975 | Japan ................................... | 420/443 |
| 5162126 | 5/1976 | Japan ................................... | 420/443 |
| 0469565 | 5/1975 | U.S.S.R. ............................. | 420/455 |

OTHER PUBLICATIONS

Shephenson et al., "Welding of Nickel Alloys in Heavy Sections for Power Generating Plant," British Welding Journal, May 1962, pp. 301–310.
Society of Automotive Engineers, Inc., Aerospace Material Specification 5798A, 1983.
Udoguchi and Nakanishi, "Structural Behavior of a Welded Superalloy Cylinder with Internal Pressure in a High Temperature Environment", Pressure Vessels and Piping, pp. 107–123 Applied Science Publishers, Ltd., Essex, England (R. W. Nichols Ed., 1981).
AWS specification for Nickel and Nickel Alloy Base Welding Rods and Electrodes SFA-5.14.
ASTM "Nonferrous Alloys" (Mar. 1967) (labeled Reference 1).
ASTM Designation B572-72 "Standard Specification for Nickel–Chromium Molybdenum–Iron Alloy" ((UNS N0600Z) Rod (labeled Reference 2).
ASTM Designation: B435-71 "Standard for Nickel–Chromium–Molybdenum–Iron Alloy" (UNS N06002) Sheet and Plate (labeled Reference 3).
AMS 5798A (labeled "Reference No. 4").
AMS 5799A (labeled "Reference No. 5").

Primary Examiner—L. Dewayne Rutledge
Assistant Examiner—Deborah Yee
Attorney, Agent, or Firm—Sughrue, Mion, Zinn, Macpeak & Seas

[57] ABSTRACT

A filler for welding a heat-resistant nickel-base alloy is disclosed. The filler comprises heat-resistant nickel-base alloy and an additive of 0.003 to 0.015 wt % boron based on the total weight of the filler metal. The filler may further comprise an other additive such as zirconium in the total amount of those two elements of 0.015 to 0.15 wt %, and the filler may further comprise the other additives such as lanthanum and cellium in the total amount of those fine elements of 0.018 to 0.15 wt % based on the total weight of the filler. The disclosed filler has improved creep properties at high temperatures and can be obtained without the defects inherent to conventional filler of heat-resistant nickel-base alloys.

4 Claims, 22 Drawing Figures

FILLER FOR WELDING A HEAT RESISTANT NICKEL-BASE ALLOY

This is a continuation of application Ser. No. 539,353, filed Oct. 6, 1983, now abandoned.

FIELD OF THE INVENTION

The present invention relates to a filler for use in welding heat-resistant nickel-base alloys to be used at temperatures as high as 1000° C.

BACKGROUND OF THE INVENTION

Recently there has been an increase in the use of devices such as gas turbines in thermal power plants, various reactors in chemical industries, atomic energy facilities, etc., which are to be operated at high temperatures. Accordingly, there has been an increase in the importance of obtaining heat-resistant metals to be used as structural materials. Metal materials used to construct such devices must function at temperatures as high as 600°-1000° C. for long periods of time, such as several tens of thousands of hours or more. One of heat-resistant metals which exhibits satisfactory strength at such high temperature is a nickel-based alloy. However, it is well known that if these devices are raised to high temperatures under even a small stress, the metal material is gradually distorted over the course of time so that it ultimately breaks down. This is referred to as the creep phenomenon. Therefore, the most important properties which the heat-resistant metal material should have are high strength and tenacity at high temperature. Further, since the devices used at such high temperatures must be constructed by welding, the creep strength of the weld joints themselves should be the same as or more than that of the heat-resistant metal itself which is a base metal. The creep strength can be represented by three important properties, i.e., the creep rate, the creep rupture time and the creep rupture ductility. For a welded structure, the weld metal itself should satisfy the requirements on the three properties. There is substantially no weld metal satisfying all of the three requirements, practically. That is, although it may be possible to obtain a weld metal where creep rupture time is substantially the same as that of the base metal, the creep rupture ductility and the creep rate of the weld metal are much smaller than those of the base metal. In view of this fact, it has been thought as generally preferable for the creep rupture time of the weld metal to be longer than that of the base metal or the creep rate thereof to be smaller than that of the base metal so that the base metal is distorted and ruptured before the distortion and rupture of the weld metal.

The weld metal forming a weld joint is first melted and then solidified. Accordingly, the micro-structure thereof is just the solidified structure which is different from that obtained by rolling of the base metal and is not metallographically stable. Therefore, even if metal material which is the same as the base metal is used as filler between the base metals welded together, the creep properties of the weld metal may be much different from those of the base metal. That is, for the welded structure, the difference in creep properties between the base metal and the weld metal causes the strength and reliability of the structure to be considerably degraded. Examples showing the above matter will be described with reference to experiments performed by the inventors.

Table 1 shows chemical components of a heat-resistant nickel-base alloy (trade name; Hastelloy X).

TABLE 1

| Constituent | % min. | % max. |
| --- | --- | --- |
| C | 0.05 | 0.15 |
| Cr | 20.05 | 23.00 |
| Co | 0.50 | 2.50 |
| Fe | 17.00 | 20.00 |
| Mn |  | 1.00 |
| Mo | 8.00 | 10.00 |
| P |  | 0.04 |
| Si |  | 1.00 |
| S |  | 0.03 |
| W | 0.20 | 1.00 |
| Ni | balance | |

Figure 1:
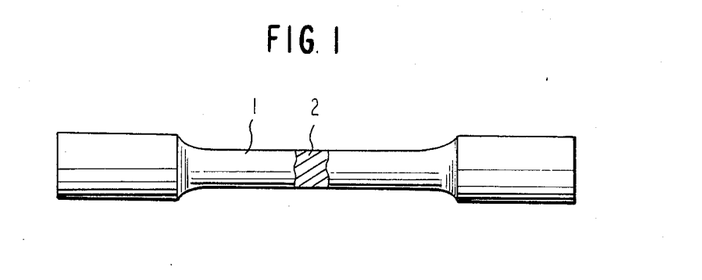
FIG. 1 shows a creep test sample in the form of a circular rod formed by welding two rod pieces together.
Figure 2:
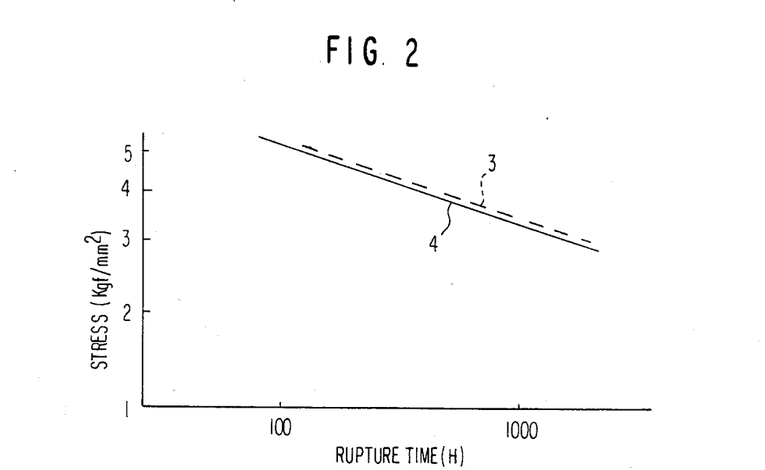
FIG. 2 is a graph showing the creep rupture strength of the test sample as shown in FIG. 1 at 900° C.

A creep test sample 1 in the shape of a circular rod as shown in FIG. 1 made of the heat-resistant nickel-base alloy shown in Table 1, was prepared. The diameter, and cross sectional area of the rod were 6 mm and 28.26 mm$^2$, respectively. A welded portion 2 of the rod 1 was formed by inert gas shielded tungsten arc welding (which herein refers to TIG). The test sample 1 was stretched axially at 900° C. and a time length from an application of a load stress to a rupture was measured. The result is shown in FIG. 2 in which a broken line 3 shows the result for a solid rod made of the heat-resistant nickel-base alloy shown in Table 1 having the same dimensions as these of the test sample 1 but having no welded portion and a solid line 4 shows the result for the test sample 1. FIG. 2 clearly shows that there is substantially no difference in the rupture time between the solid rod and the test sample 1. For the test sample 1, rupture occurred at the welded portion. However, when the temperature was 1000° C., the rupture occurred in the base metal portion of the test sample 1 which might show that the welded portion exhibits a sufficient creep strength. However, this can not be applied to a structure having such welded portions.

Figure 3:
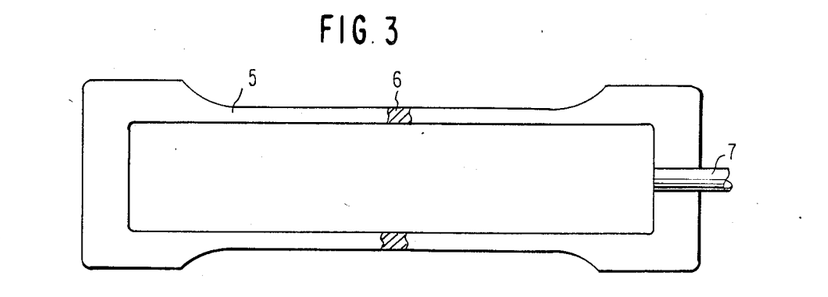
FIG. 3 shows a cylindrical creep test sample formed by welding a pair of cylindrical cups, for inner pressure creep test.
Figure 4:
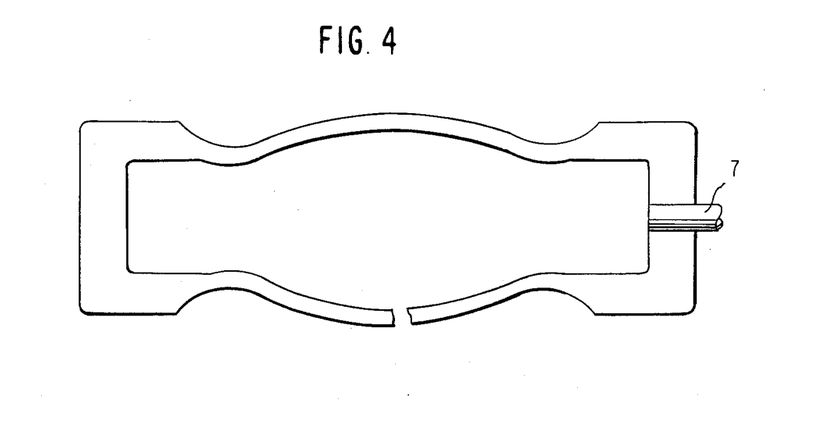
FIG. 4 illustrates creep distortions and locations thereof in a cylindrical creep test sample having no welded portion.

FIG. 3 is a cross sectional view of a cylindrical test sample 2 which was prepared by butt-welding a pair of cup shaped base metal members 5 made of the heat-resistant nickel-base alloy shown in Table 1 by using the TIG to form a welded portion 6 therebetween. One end of the test sample 2 is closed and the other end is opened through a small pipe 7. The sample made of the heat-resistant nickel-base alloy shown in Table 1, having the same shape and dimensions as those of the test sample 2 as shown in FIG. 3 but having no welded portion was also prepared for comparison purpose. Gas pressure was applied through the pipe 7 into an interior of the comparative sample and the test sample 2 to establish inner pressures of 27.5 kg/cm$^2$, 34.5 kg/cm$^2$ and 45 kg/cm$^2$, respectively. When a comparative sample was put at high temperature, it was inflated as shown in FIG. 4 and after it was inflated enough small cracks 8 occurred through which gas leeked out.

Figure 5:
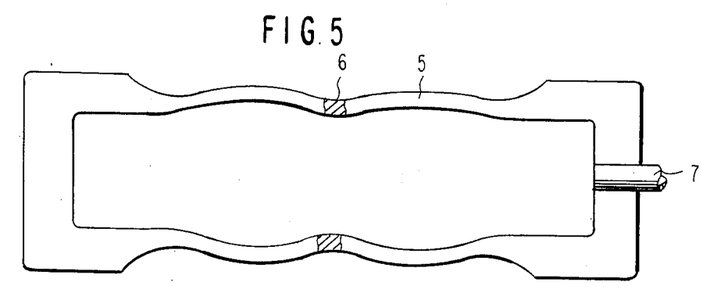
FIG. 5 illustrates creep distortions of the cylindrical creep test sample having the welded portion.

The test sample 2 was also inflated in the manner shown in FIG. 5, since the creep rate of the welded portion 6 was smaller than that of the base metal portion. Further since the creep rupture ductility of the welded portion 6 was small, cracks were produced abruptly without distortion of the welded portion. Since the creep rate of the base metal is considerably larger than that of the welded portion, the distorted base metal portion may pull the welded portion, so that rupture of the welded portion is expedited. The rupture of the cylindrical structure having the welded portion occurred within a short time, i.e., one half to one tenth the time required for the rupture of the cylindrical structure having no welded portion. In other words, the reliability of the welded structure for high temperature use depends upon a matching of the three creep properties of the base metal and weld metal.

Figure 6:
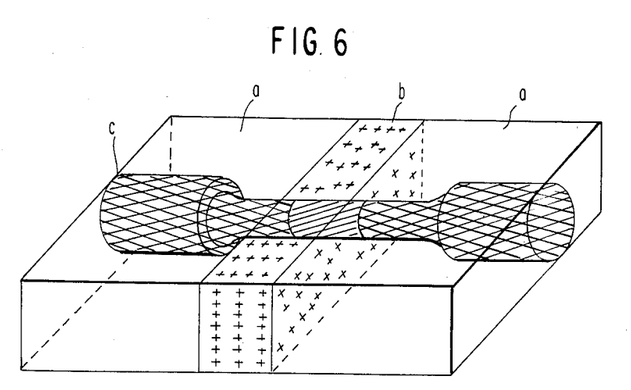
FIG. 6 shows a welded metal piece from which a mono-axial creep test sample is derived.
Figure 7:
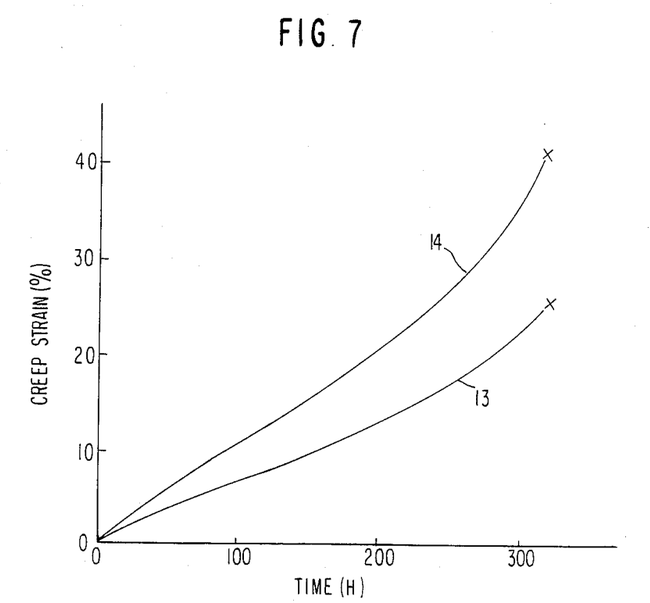
FIG. 7 is a graph showing comparative results of creep tests for clarifying a difference in creep test result between the creep test sample having a welded portion and the creep test sample having no welded portion.

As another experiment, a plate was prepared by TIG-welding together a pair of plate pieces a made of the heat-resistant nickel-base alloy shown in Table 1 as shown in FIG. 6 using a filler consisting essentially of the heat-resistant nickel-base alloy shown in Table 1, in which b shows a welded portion. By machining the thus obtained plate, a test sample c was subjected to a creep-test under a load stress of 4.5 kgf/mm$^2$ at 900° C. At the same time, a solid sample made of the heat-resistant nickel-base alloy shown in Table 1, having the same dimensions as those of the test sample c and having no welded portion was prepared and tested under the same conditions. FIG. 7 shows the results of this experiment. In FIG. 7, a curve 13 shows characteristics of the test sample c having the welded portion and a curve 14 shows characteristics of the sample having no welded portion. With respect to the test sample c having welded portion, since the creep rate of the welded portion b is smaller than that of the base metal a, the amount of creep strain over the test sample c is smaller than that of the sample having no welded portion. However, the creep rupture may occur in either the base meral portion a or the welded portion b. The creep rupture duration is substantially common for the test sample c and the sample having no welded portion.

Further, a cylindrical test sample 3 having the same dimension as in the test sample 2 as shown in FIG. 3 was prepared by TIG butt-welding a pair of cup shaced base metal members d made of the heat-resistant nickel-base alloy shown in Table 1 using a filler consisting essentially of the heat-resistant nickel-base alloy shown in Table 1, so that the resultant test sample 3 had a center welded portion e. A cylindrical sample made of the heat-resistant nickel-base alloy shown in Table 1 which has no welded portion was also prepared. A creep test was conducted for these two samples by applying an inner pressure load corresponding to 4.5 kgf/mm$^2$.

Figure 8:
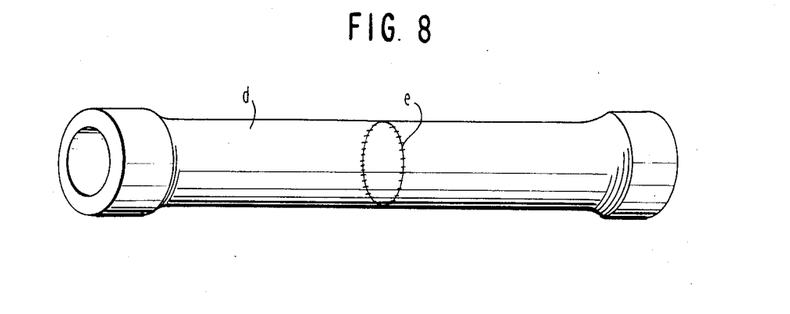
FIG. 8 is a perspective view of a cylindrical creep test sample having a welded portion at around the center portion thereof.
Figure 9:
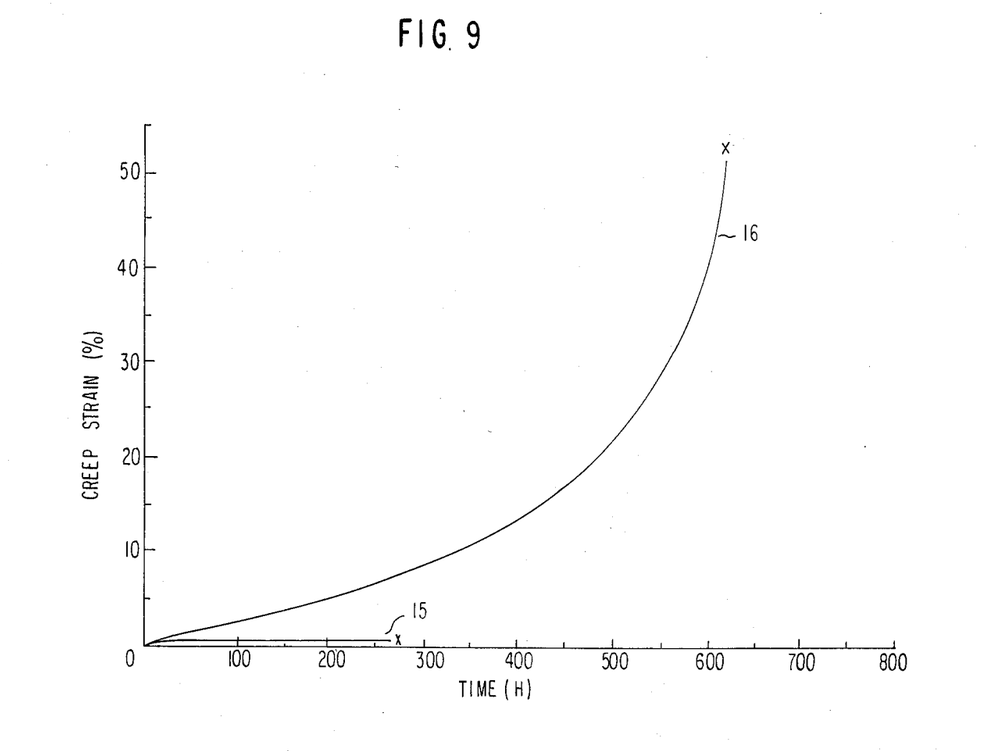
FIG. 9 is a graph showing comparative results of the inner pressure creep test for the cylindrical test samples having and not having a welded portion.

FIG. 9 shows the results of this experiment. In FIG. 9, a curve 15 shows the result for the test sample 3 shown in FIG. 8 and a curve 16 shows that for the sample having no welded portion. FIG. 9 clearly shows that the test sample 3 having the welded portion e is ruptured within a short period of time and thus it is clear that both of the creep strength and creep strain thereof are very small ccmpared with those of the sample having no welded portion. This is due to the fact that the weld metal is pulled by one base metal portion where the creep rate is larger than that of the welded portion and that the welded portion exhibits a small elongation at break, i.e., the welded portion quickly reaches an allowable elongation.

The creep property of such welded structure at high temperature depends upon the weld metal. Therefore, in order to improve the strength and tenacity of the heat-resistant metal material to be used for a structure which requires weldings, it is necessary to provide an improved filler.

It has been generally thought that when boron is added to a heat-resistant nickel-base alloy or a austenite. stainless steel, $M_2B_2$ and/or $M_3B_4$ where melting point is low is formed around columnar crystal interface and for this reason the weld cracking occurs. Further when boron is added to structural material for nuclear reactors, the structure becomes brittle with neutron irradiation. Therefore, the amount of boron to be added thereto should be as small as possible. It has been known that the creep strength of weld metal of heat-resistant nickel-base alloy varies depending on the fusing method and conditions of the filler.

SUMMARY OF THE INVENTION

While studying variations of the creep strength of heat-resistant nickel-base alloys the present inventors found that boron, a combination of boron and zirconium, or a combination of boron, zirconium, yttrium, lanthanum and cerium is very effective in improving the creep properties of weld metal and that these elements added to improve the properties also act to prevent weld cracks from occurring.

An object of the present invention is to provide a filler by which a weld metal having improved creep properties at high temperature can be obtained without the defects inherent to conventional fillers of heat-resistant nickel-base alloys.

The above object is achieved by a filler for welding of heat-resistant nickel-base alloy comprising heat-resistant nickel-base alloy and an additive of boron, the constitutional ratio of the latter to the filler being 0.003–0.015 weight %.

The object can also be achieved by a filler comprising heat-resistant nickel-base alloy and additives of small quantities of respective boron and zirconium, a total constitutional ratio of the latter two elements to the filler being 0.015–0.15 weight %.

Further the above object can be achieved by a filler consisting essentially of heat-resistant nickel-base alloy and additives of small quantities of respective boron, zirconium, yttrium, lanthanum and cerium, a total constitutional ratio of the latter five elements to the filler being 0.018–0.15 weight %.

DETAILED DESCRIPTION OF THE INVENTION

The most important creep property of weld metal which should be improved is the rupture ductility. That is, when the weld metal where rupture ductility is poor is used in a structural member and when the weld metal is distorted under stress, it may be ruptured within a short time. Therefore, in order to improve the reliability of the structure, it is most important to improve the rupture ductility of the weld metal. The next most important property to be improved may be the rupture time.

In more detail, when the filler comprises heat-resistant nickel-base alloy and an additive of small amount of boron, the filler may be prepared by fusing the latter element with a heat-resistant nickel-base alloy. Similarly, when the filler comprises heat-resistant nickel-base alloy and additives of boron and zirconium, constitutional ratios of the latter elements to the filler are preferably 0.003–0.01 weight % and 0.01–0.15 weight %, respectively. Further, when the filler is consisting essentially of heat-resistant nickel-base alloy and additives of boron, zirconium, yttrium, lanthanum and cerium, constitutional ratios of the former three elements to the filler are preferably 0.003–0.01 weight %, 0.005–0.15 wt %, and 0.003–0.005 wt %, respectively, and the total of lanthanum and cerium is 0.003–0.05 wt %.

Boron is the most effective of there additives in improving creep strength and creep elongation at break. Zirconium is not so effective in improving creep strength but it is effective in restricting variations of creep strength. Yttrium, lanthanum and cerium are effective in improving creep strength, creep elongation at break and weldability (e.g., anti-weld-cracking). In fact, by adding these five elements to the heat-resistant nickel-base alloy in suitable ratios with respect to the filler, the resultant weld metal exhibits creep strength improved by 10% or more as compared with that of filler containing only boron as the additive and the variation of creep strength is very small.

The effectiveness of the addition of a small amount of boron to the filler will be described in detail with reference to the following examples. However, the scope of the invention is not limited to these example.

EXAMPLE 1

A cylindrical test sample as shown in FIG. 3 was prepared by TIG butt-welding of cup shaped base metal members each of which is a heat-resistant nickel-base alloy shown in Table 1 using a filler according to the present invention. The cylindrical test sample had a peripheral welded portion as shown in FIG. 3. An inner pressure creep test was conducted at 900° C. under a stress corresponding to 34.5 kg/cm$^2$ in the same way as described with reference to the above described experiments performed by the inventors.

In preparing the cylindrical test sample, the filler in the form of wire having a diameter of 1.6 mm and consisting essentially of the heat-resistant nickel-base alloy shown in Table 1 and various amounts of boron (see FIG. 10) was fed continuously to the butt portion so that the filler wire was melted by an arc formed between a tungsten electrode and the base metal members to form the welded portion.

Figure 10:
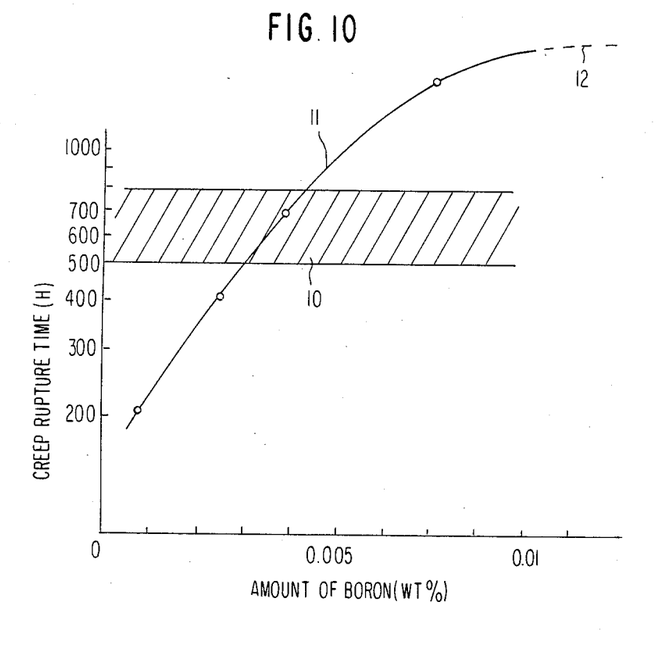
FIG. 10 is a graph showing a relation between the creep rupture time of a cylindrical test sample having a welded portion and the amount of boron contained in a filler according to the present invention.

FIG. 10 shows a relation between the amount of boron in the filler and the creep rupture time of the test sample at 900° C. under an inner stress corresponding to 34.5 kg/cm$^2$. As shown by a curve 11, the rupture time becomes longer with an increase of the amount of boron and the base metal portion of the test sample was ruptured when the ratio of boron to the filler was 0.007 wt %. When the ratio of boron was increased beyond 0.01 wt %, the improvement of the rupture time was no longer achieved, as shown by a broken line 12, due to the rupture of the base metal portion. In the same figure, the rupture time range of the cylindrical test sample having no welded portion is shown by a hatched area 10. As is clear from FIG. 10, the cylindrical test sample prepared by the welding with using the filler consisting essentially of the heat-resistant nickel-base alloy shown in Table 1 and boron in the ratio of boron to the filler of about 0.003 wt % provides similar rupture time to that obtainable in the cylindrical test sample having no welded portion.

Table 2 shows examples of creep rupture properties of a cylindrical test sample made of the heat-resistant nickel-base alloy shown in Table 1 having a welded portion formed by using the filler consisting essentially of the heat-resistant nickel-base alloy shown in Table 1 and various amounts of boron at 900° C. under a hoop stress of 3.4 kgf/mm$^2$. In these examples, when the amount of boron in the filler reaches 0.0037 wt %, the rupture time of the test sample having the welded portion reaches the same order of that having no welded portion. However, since the percentage in elongation at break of the weld metal is only 5.5%, it is not satisfactory to use it in a structure which requires increased strength. On the other hand, when the amount of boron is 0.007 wt %, the elongation of weld metal becomes 12.4% but it does not break which is about a is remarkably improved. It should be noted that the reason why the inner pressure creep rupture time of the cylindrical test sample having welded portion formed by the filler consisting essentially of the heat-resistant nickel-base alloy shown in Table 1 and boron in the ratio of boron to the filler of 0.007 wt % is longer than that of the base metal is that the creep rate of the weld metal is small enough to restrict creep distortion of the base metal.

TABLE 2

| Boron ratio in filler (wt %) | Rupture time (H) | Dimentional elongation at break (%) |
|---|---|---|
| 0.001 or less | 205 | 1.3 |
| 0.0037 | 695 | 5.5 |
| 0.0070 | 1550 | (12.4) |
| no weld | 725 | 35 |

The reason why creep properties are improved by adding a small amount of boron may be as follows:

A weld metal forming a weld joint is in a solidified state and is composed of columnar crystals. During solidification, impurity elements may be collected around interfaces of adjacent columnar crystals thus the interface strength may become weaken at high temperature, causing the interface to be peeled off from each other. Therefore, the rupture ductility may become very small and the rupture time may be shortened.

When a small amount of boron is added thereto, boron and impurity elements on the columnar crystal interfaces may be bonded to each other and the interfaces themselves may be cleaned, causing the interface strength to be improved. In fact, a microscopic analysis of the weld metal structure after the creep test showed that cracks progress straightly along the calumnar crystal interfaces when no boron is added, while, when boron is added cracks in the form of void appears around the columnar crystal interfaces firstly and these voids grow with creep distortion and are gauged with each other, causing ruptures ultimately. It was also observed that, when boron is added, the weld metal is recrystallized during a use thereof at a temperature as high as 900° to 1000° C., causing the solidified state to be changed towards the state of base metal member.

In the embodiment described hereinbefore, the TIG is used to form the welded portion. However, either the inert gas shielded metal arc welding (MIG) or arc welding using a coated electrode may be used similarly. Further the configuration of the filler may be in the form of strip having substantially the same cross sectional area as that of the wire shaped filler having a diameter of 1.0–2.6 mm.

The conventional filler of nickel based heat-resistant alloy contains naturally 0.0001–0.001 wt % boron and it is considered that the naturally contained boron is one of causes of the variation of creep properties of the weld metal.

In the filler according to the present invention the lower limit of the amount of boron to be added thereto is set as 0.003 wt % to improve the creep properties. As to the upper limit thereof, 0.01 wt % may be enough to practically obtain a good result. However, since the yield of boron in fusing it into the heat-resistive metal is relatively low, it is set as being 0.015 wt %, in this invention to thereby ensure the improvement of the properties. It has been found that such an amount of boron as 0.015 wt % does not affect a resultant welded portion adversely. However, if the amount reaches the order of 0.02 wt %, the possibility of cracking of a welded portion may become large and/or the welded portion may be easily broken by a bending test, due to combined effect thereof with impurities.

As will be clear from the foregoings, the heat-resistant nickel-base alloy containing a proper amount of boron is a usable metal for not only the filler but also the base metal to be welded. As an example, heat-resistant nickel-base alloy containing elements shown in Table 1 and, in addition thereto, 0.007 wt % boron was prepared by fusion from which a creep test solid sample in the form of a circular rod as shown in FIG. 1 without having a welded portion was made. The circular rod was subjected to a creep test at 900° C. under a stress of 4.5 kgf/mm$^2$. Test results are shown in Table 3.

TABLE 3

| Test rod material | Rupture time (H) | Rupture reduction (%) |
|---|---|---|
| Heat-resistant nickel-base alloy containing 0.007 wt % boron | 2700 | 16 |
| Standard filler for Hastelloy X | 280 | 1 |
| Standard heat-resistant nickel-base alloy (Hastelloy X) | 650 | >30 |

As shown in Table 3, the creep rupture time of the heat-resistant nickel-base alloy containing 0.007 wt % boron exhibits about 4 times that of the standard heat-resistant nickel-base alloy.

Generally, the elongation at break of heat-resistant nickel-base alloy tends to become short with test time, which is recognized as a defect. The addition of boron to the alloy is also effective to eliminate such a defect. Further, since the ductility of the alloy at high temperatures can be improved remarkably by adding boron as mentioned previously, the high temperature fatigue properties thereof which largely depends on the ductility may be improved effectively by the addition of boron.

The effectiveness of the addition of a small amount of boron and zirconium will be described with reference to the following embodiments.

EXAMPLE 2

Figure 11:
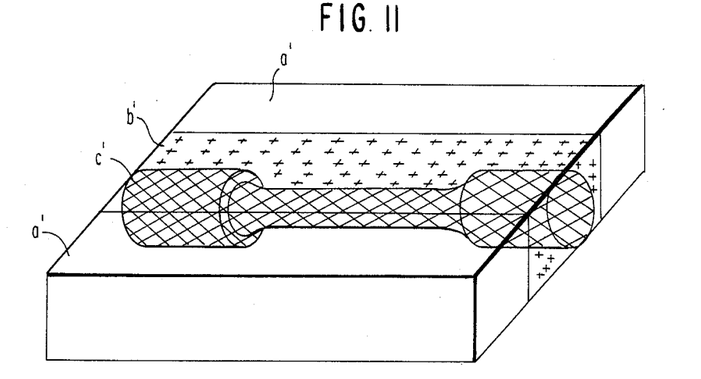
FIG. 11 shows a welded metal piece from which a mono-axial creep test sample is derived.

Filler consisting essentially of the nickel based heat-resistant alloy shown in Table 1 and various amounts of boron and zirconium was prepared by fusion. The fillers consisting essentially of 0.004 wt % boron, 0.013 wt % zirconium and the heat-resistant nickel-base alloy shown in Table 1, and 0.008 wt % boron, 0.018 wt % zirconium and the heat-resistant nickel-base alloy shown in Table 1. Base metal pieces a, a' to be welded were of the nickel-based heat-resistant alloy shown in Table 1 and these base metal pieces a, a' were welded together by means of the TIG with using the above mentioned fillers b, b' as shown in FIG. 6 and FIG. 11, respectively.

Then creep test samples c, c' were prepared from these welded base metal pieces, respectively, and tested on creep properties under a stress of 4.5 kgf/mm$^2$ at 900° C., respectively. As a result, the test samples c which had welded portions in center portion thereof respectively, were broken at their base metal portion, showing that the creep strength of the weld metal was higher than that of the base metal pieces a. As to the test samples c', the creep properties thereof was determined and compared with the creep properties of a weld metal of the above described conventional filler. The results of comparison are shown in FIGS. 12 and 13.

Figure 12:
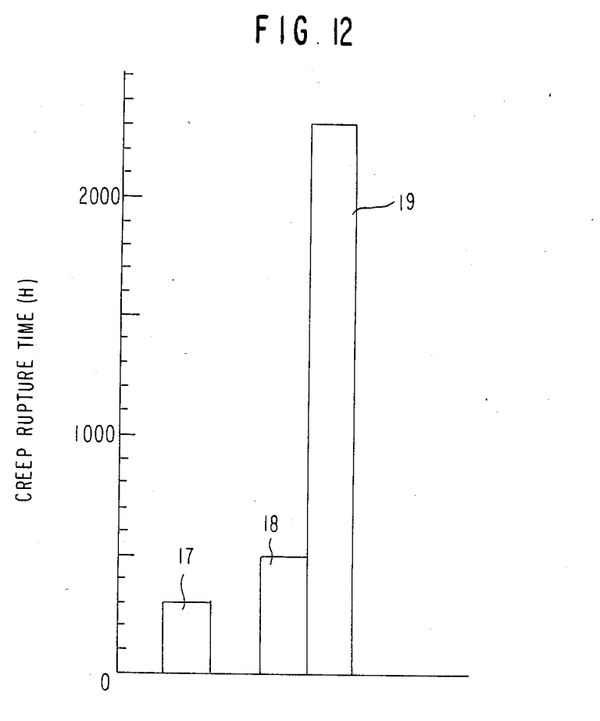
FIG. 12 is a bar graph showing the creep rupture times for the case of the present filler and the case of the conventional filler.

FIG. 12 shows comparative data of the average creep rupture time with bar graph in which reference numeral 17 is for the creep rupture time of the conventional test sample formed by welding the heat-resistant nickel-base alloy shown in Table 1 with using a filler of the same alloy, and reference numerals 18 and 19 are for the creep rupture time when the filler metal according to the present invention was used. That is, the reference numeral 18 is for the creep test sample welded by using the filler consisting essentially of 0.004 wt % boron, 0.013 wt % zirconium and the heat-resistant nickel-base alloy shown in Table 1 and 19 is for that by using the filler consisting essentially of 0.008 wt % boron, 0.018 wt % zirconium and the heat-resistant nickel-base alloy shown in Table 1. As is clear from FIG. 12, the creep properties of the test sample shown by reference numeral 19 which contains larger amounts of boron and zirconium than those of the test sample shown by the reference numeral 18 exhibit a longer creep rupture time than that of the latter, which is about 8 times that of the creep rupture time of the above described conventional weld metal sample shown by the reference numeral 17.

Figure 13:
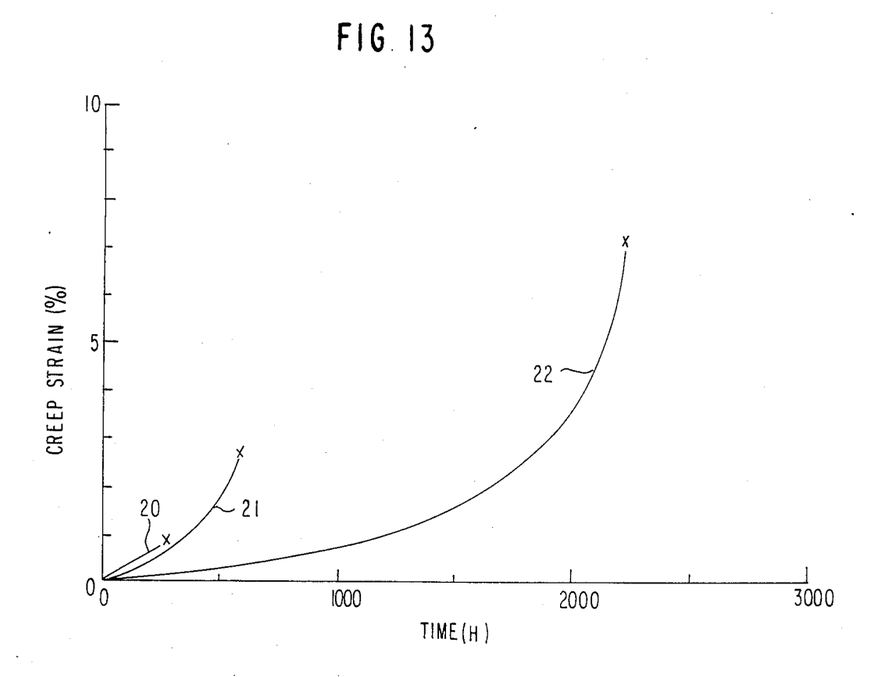
FIG. 13 is a graph showing the creep strain for the case of weld metal using the present filler and the case of that using the conventional filler.

FIG. 13 shows comparative data of the amount of creep strain and test time for the creep test samples c' prepared from the weld metals resulting from the above described conventional filler and from the filler according to the present invention. In FIG. 13, curves 20, 21 and 22 show the above described conventional weld metal, the weld metal resulting from the present filler consisting essentially of 0.004 wt % boron, 0.013 wt % zirconium and the heat-resistant nickel-base alloy shown in Table 1 and the weld metal resulting from the present filler consisting essentially of 0.008 wt % boron and 0.018 wt % zirconium and the heat-resistant nickel-base alloy shown in Table 1. It is clear from the curve 20 in FIG. 13 that the above-described conventional weld metal shows a linear relation between the amount of creep strain and the time and that it is broken even before the amount of creep strain reaches about 1%. On the other hand, the curves 21 and 22 for the weld metals according to the present invention show initial small creep strain amounts, respectively. Particularly, the curve 22 which is the data of the filler containing larger amounts of boron and zirconium than those in the filler corresponding to the curve 21 exhibits that the initial small creep strain amount is persistent for a long time and the strain increases gradually in the later part of the creep and ultimately it is broken. This property is very similar to that of the test sample having no welded portion. The amount of creep strain shown by the curve 22 for the filler containing large amounts of boron and zirconium reaches 10 or more times as much as that shown by the curve 20 for the above described conventional filler.

As mentioned previously, the uniaxial creep test of weld metal according to the present invention shows a remarkably improved strength of the weld metal. Therefore, in a welded structure to which the inner pressure creep test is applicable, it is expected that, even when the weld metal is subjected to a tension stress due to a creep distortion of the base metal portion around the weld metal, it is durable and rather acts to restrict the creep distortion of the base metal portion whereby the creep duration thereof become longer than that of a structure having no weld joint. The conditions employed in the creep tests the result of which are shown in FIGS. 12 and 13 were temperature of 900° C. and load stress of 4.5 kgf/mm$^2$.

When the total amount of B and Zr added to the filler is two large the grain foundary melting of B and Zr inter-metallic compound may occur, causing weld cracking. Therefore, the total amount of these elements should be as small as possible.

Figure 14:
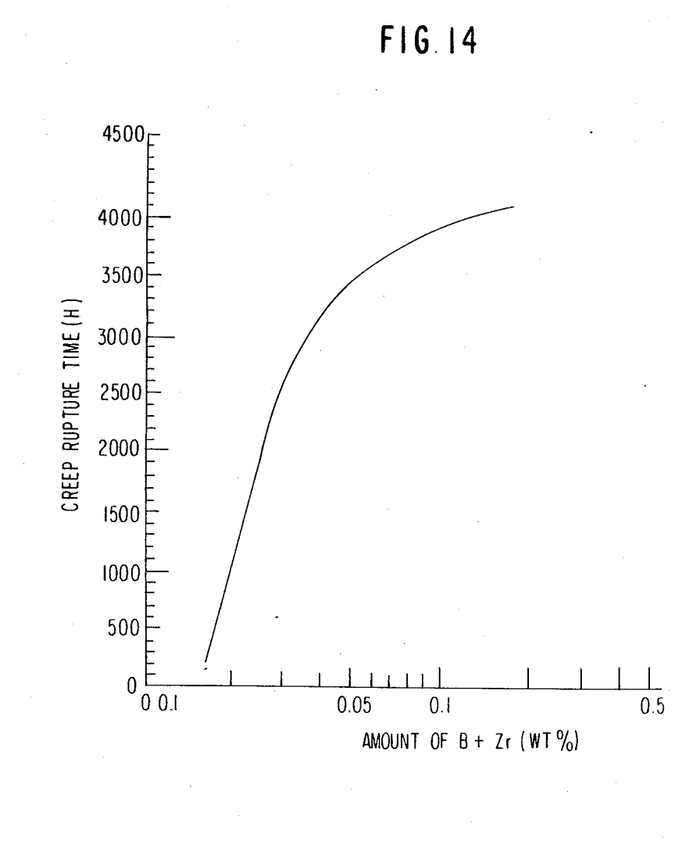
FIG. 14 shows a variation of the creep rupture time with an amount of B and Zr.

A curve in FIG. 14 shows a relation between the total amount of B and Zr and the creep rupture time. From the curve, it is clear that when the total amount of B and Zr in the filler becomes about 0.15 wt %, weld cracking occurs and further use of the welded structure may become impossible. Therefore, the total amount of B and Zr in the filler should be 0.15 wt % or lesser. On the other hand, when the total amount of B and Zr is less than 0.015 wt %, the creep strength of the weld metal becomes lower than that of the base metal and the effect of addition of B and Zr to the filler is substantially negligible. The creep rupture time of the base metal in this case is 300 hours which corresponds to a case where the total amount of B and Zr is about 0.015 wt % in FIG. 14.

Further, since when only 0.012 wt % boron is added to the filler, weld cracking occurs, the amount of boron to be added to the filler should be up to 0.01 wt %. Although the addition of boron alone is effective, the addition of zirconium in addition thereto results in a remarkable reduction of the possibility of weld cracking and an improvement of the creep strength. In this case, however, when the amount of zirconium is less than 0.01 wt %, there is no clear effect in the weldability. Therefore, the lower limit of the amount of zirconium should be 0.01 wt %.

Figure 15:
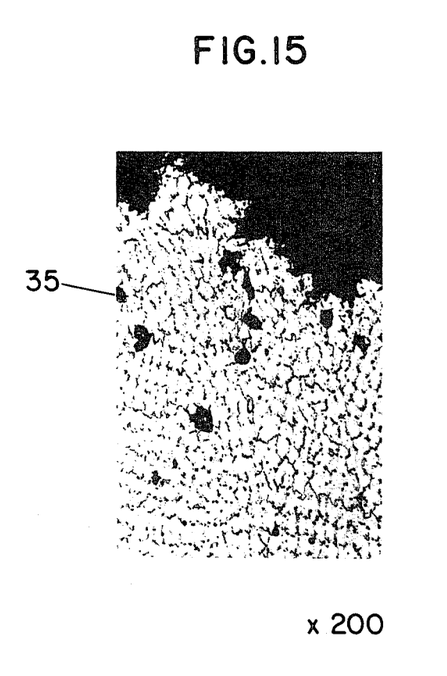
FIG. 15 is a microscopic structure of a weld metal using the present filler after creep rupture thereof.
Figure 16:
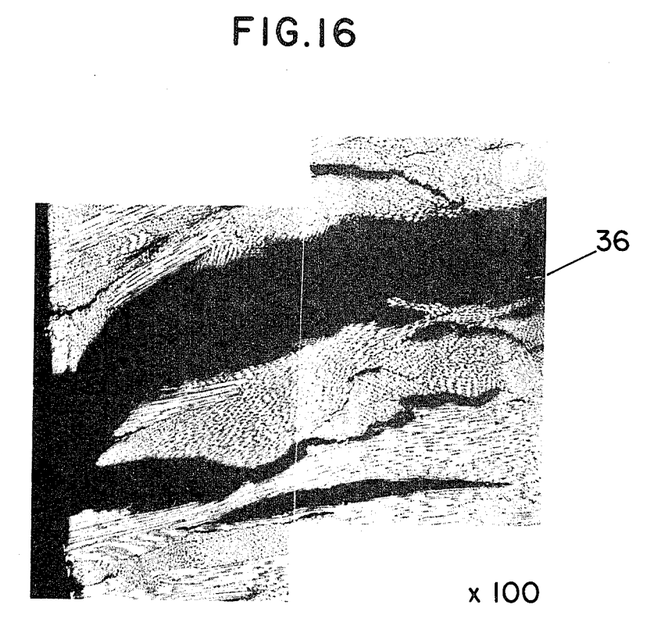
FIG. 16 is a microscopic structure of a weld metal using the conventional filler after creep rupture thereof.

FIG. 15 is a microscopic photograph of a cross sectional structure of a broken portion of the weld metal after the creep test thereof when base metal pieces of heat-resistant nickel-base alloy shown in Table 1 were welded together using the filler according to the present invention, and FIG. 16 is a microscopic photograph of a cross sectional structure of a broken portion of a weld metal formed by using the above described conventional filler after the creep test thereof, for comparison purpose. FIG. 15 using the present filler shows that, by adding B and Zr, many effects such as that the melting point of impurity elements existing in the grain boundaries is increased and that the increase of grain size of carbide precipitated in the grain boundaries is restricted to prevent carbide grains from becoming continuous are obtained.

From these effects, the strength in the grain boundary is remarkably improved. Further, since there is a recrystallization occurs during the creeping, causing large crystal to be changed to fine and stable crystal structures, the rupture occurs only when voids 35 in the grain boundaries becomes continuous. The latter phenomenon is very similar to the rupture of the base metal. On the other hand, for the above described conventional weld metal shown in FIG. 16, rough columner structure similar to that obtained by welding is reserved as it is, with cracks 36 being provided on a surface extending straightly along grain boundaries. The rupture occurs within a short time by growth of these cracks and thus the elongation at break is very small. It is clear from FIGS. 15 and 16 that the addition of a small amount of B and Zr improves the crystal structure of the weld metal and hence the creep characteristics thereof.

As described hereinbefore, the heat-resistant nickel-base alloy has been welded together by using the filler of the same material as the base metal.

Accordingly to this invention, in order to improve the creep properties of the weld metal at high temperature a small amount of boron and zirconium is added to improve the weld metal structure such that the strength thereof at high temperature becomes equal to or larger than that of the base metal after the welding and the occurrence of defects due to the weld metal is restricted.

As metals to be added to the filler, boron and zirconium has been described. However, it is possible to further add other materials to the filler with at least similar effects. In the following embodiments, a small amount of Y, La and Ce is added to the filler together with B and Zr.

EXAMPLE 3

The filler was prepared by fusing heat-resistant nickel-base alloy shown in Table 1 and various amounts of B, Zr, Y, La and Ce. The filler consisting essentially of 0.004 wt % B, 0.014 wt % Zr, 0.022 wt % Y, totally 0.026 wt % La and Ce and the heat-resistant nickel-base alloy shown in Table 1 and the filler consisting essentially of 0.005 wt % B, 0.006 wt % Zr, 0.014 wt % Y, totally 0.006 wt % La and Ce and the heat-resistant nickel-base alloy shown in Table 1 were tested. Base metal pieces made of the heat-resistant nickel-base alloy in Table 1 were welded together by using the above described fillers with the TIG and, from the welded base metal pieces, test samples c and c' in FIGS. 6 and 11 were prepared, respectively, where a' is the base metal piece and b' is the weld metal. The test samples c and c' were tested on the creep properties, at 900° C. under a load stress of 4.5 kgf/mm². The test samples c which had the weld metal at around the center portion thereof were broken at the base metal portion thereof, showing that the creep strength of the weld metal is greater than that of the base metal. As to the test samples c' of the weld metal, the creep properties of the weld metal per se was obtained and compared with that of the above described conventional weld metal of the same material as that of the base metal. The results are shown in FIGS. 17 and 18.

Figure 17:
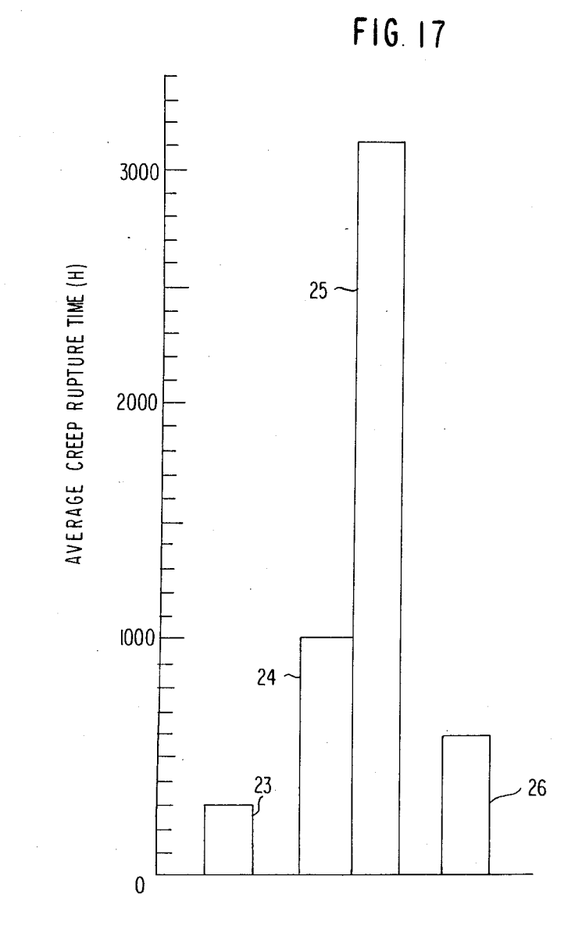
FIG. 17 is a bar graph showing the creep rupture times for the case of the present filler and the case of the conventional filler.

FIG. 17 is a bar graph showing the average creep rupture time for the weld metal formed by using the above-described conventional filler and those formed by using the present filler, in which reference numeral 23 is for the creep rupture time of the weld metal prepared by the filler of the same material as the heat-resistant nickel-base alloy in Table 1 and, 24 and 25 are those of the weld metals prepared by using the present fillers, respectively. That is, the bar graph shown by the reference numeral 24 is the result when the filler is consisting essentially of 0.005 wt % B, 0.006 wt % Zr, 0.014 wt % Y, totally 0.006 wt % La and Ce and the heat-resistant nickel-base alloy in Table 1 and the bar graph shown by the reference numeral 25 is the result when the filler is consisting essentially of 0.004 wt % B, 0.014 wt % Zr, 0.022 wt % Y, totally 0.026 wt % La and Ce and the heat-resistant nickel-base alloy in Table 1. As is clear from FIG. 17, the bar graph shown by the reference numeral 25 for the filler consisting essentially of a larger amount of B, Zr, Y, La, Ce and the heat-resistant nickel-base alloy in Table 1 than others exhibits as long creep rupture duration as about ten times that of the filler shown by the bar graph shown by the reference numeral 23. In FIG. 17, the bar graph shown by the reference numeral 26 shows the result of the base metal per se.

Figure 18:
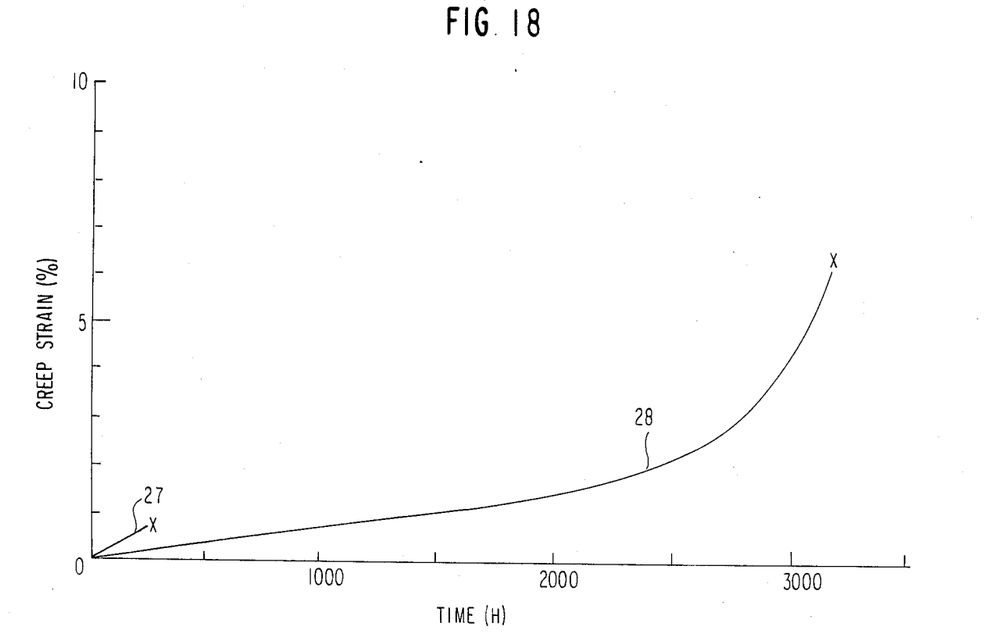
FIG. 18 is a graph showing the creep strain for the case of the present filler and the case of the conventional filler.

FIG. 18 shows a relation between the amount of creep strain and the test time for the test samples c' having the weld metals formed by the above described conventional filler and the present filler, respectively. In FIG. 18, curves 27 and 28 are properties of the weld metal prepared by using the above described conventional filler and the weld metal prepared by using the present filler consisting essentially of, 0.004 wt % B, 0.014 wt % Zr, 0.022 wt % Y, totally 0.026 wt % La and Ce and the heat-resistant nickel-base alloy in Table 1. From FIG. 18, it is clear that the amount of creep strain of the above described conventional weld metal changes linearly with time as shown by the curve 27 and that the weld metal is broken even before the amount of creep strain reaches about 1%. On the other hand, when the present filler is used, the amount of creep strain of the weld metal at the initial stage is very small and increases at a low rate for a relatively long time. Thereafter, it increases gradually at a higher rate until the weld metal is broken, as shown by the curve 28.

In addition to the merit on the creep distortion mentioned above, the strength of the weld metal is remarkably improved when the present filler is used, and, thus, for a welded structure to which the inner pressure creep test is applicable, the weld metal, when pulled by the base metal portion due to the distortion thereof, resists the pulling force and rather acts to restrict the creep distortion of the base metal, resulting in creep duration longer than that of a structure having no weld joint. The creep tests shown in FIGS. 17 and 18 were performed at 900° C. under a load stress of 4.5 kgf/mm².

When the total amount of B, Zr, Y, La and Ce to be added to the filler is too large, the grain boundary melting of intermetallic compound formed therewith may occur, resulting in the weld cracking or the cracking may easily occur by a bending test after the welding. Therefore, the total amount of these elements should be as small as possible.

Figure 19:
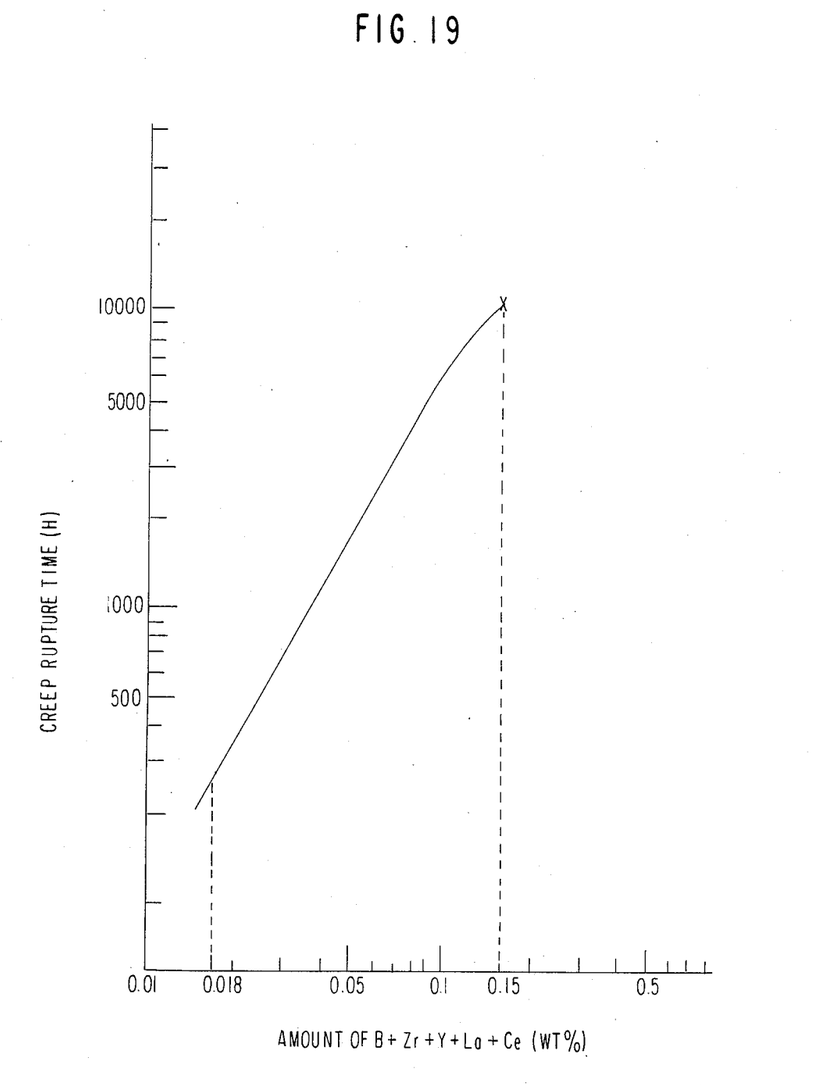
FIG. 19 is a graph showing a relation between the creep rupture time and the amount of B, Zr, Y, La and Ce.

FIG. 19 shows a relation between the total amount of B, Zr, Y, La and Ce and the creep rupture time. From FIG. 19, it is clear that when the total amount is about 0.15 wt %, weld cracking occurs. Therefore, the amount should be less than 0.15 wt %. On the other hand, with the total amount of these element less than 0.018 wt %, the creep strength of the weld metal become lower than that of the conventional one. That is, the creep rupture time of the weld metal formed by using the conventional filler is 300 hours which corresponds to the total amount of B, Zr, Y, La and Ce of 0.018 wt % on the curve in FIG. 19.

When weld metals formed by a filler consisting essentially of 0.012 wt % boron alone and the heat-resistant nickel-base alloy in Table 1 were tested according to the butt weld metal cracking test method using JISZ3155C type clamping, longer cracks than the limit length were observed in some of them. Therefore, the amount of boron should be less than 0.01 wt %. Further it has been found that it is possible to improve the creep strength of the weld metal even if the amount of boron is very small, provided that zirconium, yttrium, lanthanum and cerium are further added. For example, in a creep test of a test sample prepared from the weld metal shown in FIG. 11, at 900° C. under stress of 4.5 kgf/mm², the creep rupture time of the weld metal formed by using the filler consisting essentially of 0.007 wt % boron alone and the heat-resistant nickel-base alloy in Table 1 was 2,700 hours and that the weld metal formed by using the filler consisting essentially of 0.004 wt % boron totally 0.066 wt % of Zr, Y, La and Ce and the heat-resistant nickel-base alloy in Table 1 was 2,900 hours. Although boron affects the creep strength largely, the amount thereof should be as small as possible, particularly, when it is used as structural material of an atomic reactor because it becomes brittle with neutron irradiation. By reducing the amount of boron and, instead, adding Zr, Y, La and Ce thereto, the effect of boron on the resultant weld metal is improved and a weld metal having a large creep strength is obtained.

Although zirconium is generally effective in reducing the possibility of weld cracking of an alloy containing boron, the effect is unclear when the amount thereof is smaller than 0.005 wt %. Therefore, the lower limit thereof should be 0.005 wt %. Further, when the amount of zirconium was larger than 0.15 wt %, the possibility of weld cracking was increased. Therefore, the upper limit thereof should be 0.15 wt %.

Yttrium, lanthanum and cerium were added to improve the creep rupture ductility. However, it has been found that the addition of these elements is rather effective in elongation of the creep rupture duration. When only boron and yttrium were added, the creep rupture ductility of the weld metal was 5-10% which is a considerable improvement when compared with the ductility of the conventional weld metal of about 1%. However, the creep rupture duration of the weld metal containing only boron and yttrium was shorter than that of the weld metal containing only boron. The addition of lanthanum and cerium eliminates the above problem of the short creep rupture duration. As to the amounts of yttrium, lanthanum and cerium, when the amount of yttrium and the total amount of lanthanum and cerium were in a range 0.005-0.006 wt %, respectively, a remarkable improvement on the creep rupture duration of the weld metal was recognized. It may be possible to improve the creep rupture duration with even smaller amounts of these elements. However, since it was very difficult to control such small amounts thereof, no test was performed to prove such improvement with reduced amounts of these elements. Therefore, in this embodiment, the lower limits of the amount of yttrium and the total amounts of lanthanum and cerium were set at 0.003 wt %, respectively, which corresponds to about a half the total amount of yttrium, lanthanum and cerium. When the amount of yttrium and the total amount of lanthanum and cellium were 0.03 wt % and 0.05 wt %, respectively, inferior rate in the weld crack test and in the bending test after the welding became higher, although the improvement on the creep strength was remarkable.

Table 4 shows the test results.

TABLE 4

| | Additives in filler | Weld crack test (crack) rate (%)) | Bending test (No. of breaks/ No. of tests) |
|---|---|---|---|
| 1. | 0.004% B, 0.016% Zr | 4.5-7.5 | 0/3 |
| 2. | 0.004% B, 0.016% Zr 0.026% Y, 0.035% (La + Ce) | 9-12 | 1/3 |
| 3. | 0.004% B, 0.016% Zr 0.048% Y, 0.055% (La + Ce) | 10-13 | 3/3 |

Figure 20:
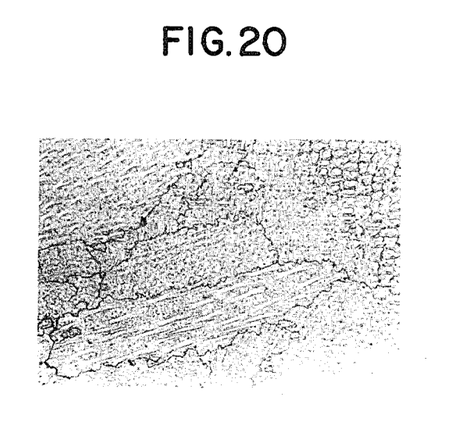
FIG. 20 is a microscopic structure of a weld metal formed by using the present filler.
Figure 21:
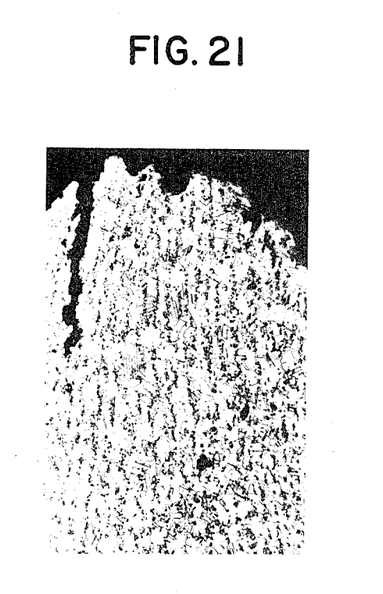
FIG. 21 is a microscopic structure of the weld metal in FIG. 20 after creep rupture thereof.

FIG. 20 is a microscopic photographic showing the structure of the weld metal when a pair of metal pieces each of the heat-resistant nickel-base alloy shown in Table 1 were welded together by the TIG using the present filler. From FIG. 20, it is clear that the crystal grain size is very large and there is no substantial difference between it and the size of the conventional weld metal. FIG. 21 is a microscopic photograph showing the structure of the identical weld metal to the above after the creep rupture. In FIG. 21, it is clear that recrystallization occurred during the creep, resulting in fine crystal grain. Such structural charge can not be observed in the conventional weld metal.

The reasons for why the creep strength is improved by the filler consisting essentially of B, Zr, Y, La and Ce to the heat-resistant nickel-base alloy may be that these elements together with impurities in the grain boundaries form high melting point compounds by which the strength of the grain boundary at high temperature is improved and that, due to these elements where atom sizes are much different from those of elements constituting the heat-resistant nickel-base alloy, the distortion resistance at high temperature is large, causing an irregularity in atomic arrangement. That is, due to the formation of the high melting point compounds, the rupture ductility is improved comparing with the conventional weld metal where the strength of grain boundary is very low, ard the recrystallization is facilitated due to the irregularity of atomic arrangement. With these effects, the weld metal structure is charged as shown in FIG. 21, causing the creep characteristics thereof to be similar to that of the base metal.

EXAMPLE 4

Figure 22:
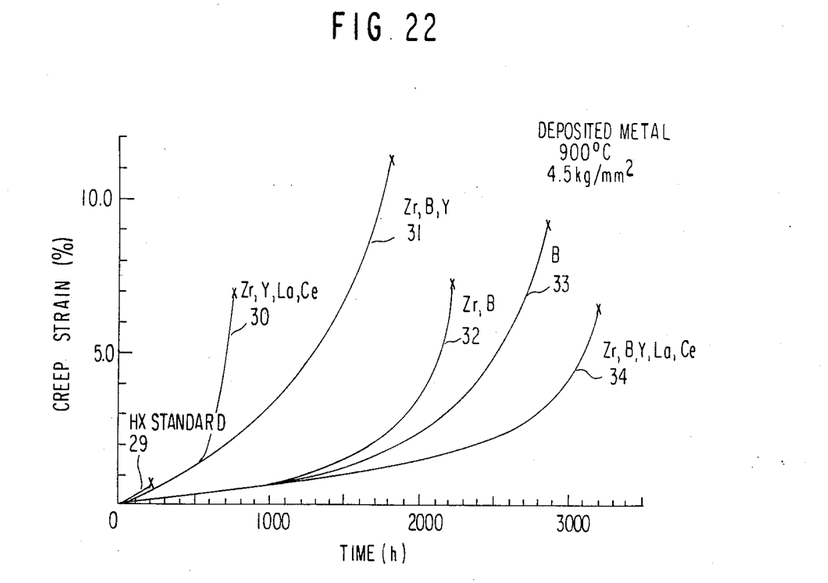
FIG. 22 is a graph showing the improvement in the creep strength of the weld metal by adding the small amount of an additive or additives to a conventional filler.

Base metal pieces of each the heat-resistant nickel-base alloys shown in Table 1 were prepared and these base metals were welded together by the TIG using the above described conventional filler having the same composition as that of the base metal and using the present filler consisting essentially of the same material as that of the base metal and various amounts of B, Zr, Y, La and Ce as additives. From the welded base metal, test samples as shown in FIG. 11 were prepared. These test samples were subjected to the creep test under the common conditions of temperature of 900° C. and load stress of 4.5 kgf/mm$^2$. Resultant creep strains are shown in FIG. 22. In FIG. 22, the curves shown by reference numerals 29, 30, 31, 32, 33 and 34 show creep strains of the weld metals of the test samples welded by using the above described conventional filler, the comparative filler consisting essentially of Zr, Y, La and Ce in the total amount of 0.052 wt % and the heat-resistant nickel-base alloy in Table 1, the comparative filler consisting essentially of Zr, B and Y in the total amount of 0.031 wt % and the heat-resistant nickel-base alloy in Table 1, the present filler consisting essentially of Zr and B in the total amount of 0.026 wt % and the heat-resistant nickel-base alloy in Table 1, the present filler consisting essentially of B in the amount of 0.007 wt % and the heat-resistant nickel-base alloy in Table 1, and the present filler consisting essentially of Zr, B, Y, La and Ce in the total amount of 0.0685 wt % and the heat-resistant nickel-base alloy in Table 1, respectively. As is clear from FIG. 22, the creep strength and the amount of creep strain of the weld metal are much improved by adding the small amount of the additive or additives to the conventional filler.

The filler according to the present inventions can be used in not only the TIG or MIG but also other welding metals such as the electron beam welding and diffusion welding, etc. In the latter case, the filler may take the form of a plate or foil so as to be used as an insert material to be inserted between the base metal pieces to be welded together. Further, it may be possible to add flux to the present filler to facilitate the welding. The present filler comprising a small amount of B and the heat-resistant nickel-base alloy in Table 1 or B, Zr and the heat-resistant nickel-base alloy in Table 1, or consisting essentially of B, Zr, Y, La, Ce as additives and the heat-resistant nickel-base alloy in Table 1 provides a weld metal which is superior in the creep properties at high temperature and exhibits as high strength at high temperature as or even higher strength than that of the base metal, and the present filler can be used even as structural material.

While the invention has been described in detail and with reference to specific embodiments thereof, it will be apparent to one skilled in the art that various changes and modifications can be made therein without departing from the spirit and scope thereof.

What is claimed is:

1. A process comprising welding two heat-resistant nickel-chromium-molybdenum-base alloy components together using as a filler a heat-resistant nickel-chromium-molybdenum-base alloy consisting essentially of:
    boron in an amount of 0.003 to 0.015 wt %;
    0.05 to 0.15 wt % C; 20.05 to 23.00 wt % Cr; 0.5 to 2.50 wt % Co; 17.00 to 20.00 wt % Fe; up to 1.00 wt % Mn; 8.00 to 10.00 wt % Mo; up to 0.04 wt % P; up to 1.00 wt % Si; up to 0.03 wt % S; 0.2 to 1.00 wt % W; boron in an amount of 0.003 to 0.015 wt %; zirconium in an amount of 0.01 to 0.15 wt %; yttrium in an amount of 0.003 to 0.005 wt %; and lanthanum and cerium in an amount of 0.003 to 0.05 wt %; and the balance Ni; base on the total weight of the filler.

2. A process as claimed in claim 1, wherein the filler contains boron in an amount of 0.005 to 0.015 wt %.

3. A process as claimed in claim 1, wherein the filler contains boron in an amount of 0.005 to 0.01 wt %.

4. A process as claimed in claim 1, wherein the total amount of boron, zirconium, yttrium, lanthanum and cerium in the filler is in the range of 0.018 to 0.15 wt %.

* * * * *